US012604228B2

(12) United States Patent
Maldonado et al.

(10) Patent No.: US 12,604,228 B2
(45) Date of Patent: Apr. 14, 2026

(54) EVENT-TRIGGERED CROSS-LINK INTERFERENCE MEASUREMENT REPORTING

(71) Applicant: NOKIA TECHNOLOGIES OY, Espoo (FI)

(72) Inventors: Roberto Maldonado, Aalborg (DK); Nhat-Quang Nhan, Reims (FR); Elena Peralta Calvo, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 396 days.

(21) Appl. No.: 18/102,624

(22) Filed: Jan. 27, 2023

(65) Prior Publication Data
US 2024/0259847 A1    Aug. 1, 2024

(51) Int. Cl.
*H04W 24/10* (2009.01)
*H04W 24/02* (2009.01)
*H04W 24/08* (2009.01)

(52) U.S. Cl.
CPC ........... *H04W 24/10* (2013.01); *H04W 24/08* (2013.01); *H04W 24/02* (2013.01)

(58) Field of Classification Search
CPC ..... H04W 24/10; H04W 24/08; H04W 24/02; H04B 17/295; H04B 17/24; H04B 17/345; H04L 5/0055; H04L 1/1812
See application file for complete search history.

(56) References Cited

U.S. PATENT DOCUMENTS

| | | | | |
|---|---|---|---|---|
| 2008/0188216 A1* | 8/2008 | Kuo | ...................... | H04W 24/08 |
| | | | | 455/424 |
| 2013/0229971 A1* | 9/2013 | Siomina | ................ | H04W 24/10 |
| | | | | 370/312 |
| 2020/0275298 A1* | 8/2020 | Xu | ...................... | H04L 25/0226 |

(Continued)

FOREIGN PATENT DOCUMENTS

| | | |
|---|---|---|
| CN | 114070473 A | 2/2022 |
| WO | 2021/208003 A1 | 10/2021 |

OTHER PUBLICATIONS

Extended European Search Report issued in corresponding European Patent Application No. 23212240.8-1215 on Jun. 5, 2024.

(Continued)

*Primary Examiner* — Oussama Roudani
(74) *Attorney, Agent, or Firm* — SQUIRE PATTON BOGGS (US) LLP

(57) ABSTRACT

Systems, methods, apparatuses, and computer program products for event-triggered cross-link interference (CLI) measurement reporting. A method may include receiving a configuration with event triggered reporting from a network element. The configuration may specify criteria for triggering a cross-link interference measurement reporting. The method may also include performing cross-link interference measurements of at least one radio transmission on network configured resources based on the configuration. The method may further include determining whether the criteria has been satisfied based at least on a condition out of a set of conditions identified in the criteria. In addition, the method may include transmitting a measurement report of the cross-link interference measurements to the network element when the condition meets a predefined threshold.

13 Claims, 9 Drawing Sheets

(56) References Cited

U.S. PATENT DOCUMENTS

| | | | |
|---|---|---|---|
| 2020/0389805 A1 | 12/2020 | Kim et al. | |
| 2022/0158782 A1 | 5/2022 | Qi | |
| 2022/0368435 A1 | 11/2022 | Jin et al. | |
| 2023/0232446 A1* | 7/2023 | Jiang | H04W 74/006 |
| | | | 370/329 |
| 2023/0269611 A1* | 8/2023 | Ren | H04W 24/10 |
| | | | 370/252 |
| 2023/0327803 A1* | 10/2023 | Katzav | H03M 13/00 |
| 2023/0388095 A1* | 11/2023 | Hafeez | H04L 5/14 |
| 2024/0137965 A1* | 4/2024 | Zhang | H04W 72/25 |
| 2024/0154732 A1* | 5/2024 | Noh | H04L 1/1614 |
| 2024/0187127 A1* | 6/2024 | Narayanan Thangaraj | |
| | | | H04L 5/0055 |
| 2024/0196389 A1* | 6/2024 | Koskela | H04W 72/1268 |
| 2024/0237045 A9* | 7/2024 | Zhang | H04L 5/0035 |
| 2025/0226899 A1* | 7/2025 | Xiong | H04L 5/0073 |

OTHER PUBLICATIONS

CMCC, New SI: Study on Evolution of NR Duplex Operation, 3GPP TSG RAN#94-e, Electronic Meeting, Dec. 6-17, 2021, RP-213591 (revision of RP-213586), 5 pages.

3GPP TS 38.133 V17.8.0 (Dec. 2022), Technical Specification, 3rd Generation Partnership Project; Technical Specification Group Radio Access Network; NR; Requirements for Support of Radio Resource Management (Release 17), 5,853 pages.

3GPP TS 38.300 V17.3.0 (Dec. 2022), Technical Specification, 3rd Generation Partnership Project; Technical Specification Group Radio Access Network; NR; NR and NG-RAN Overall Description; Stage 2 (Release 17), 210 pages.

3GPP TS 38.331 V17.3.0 (Dec. 2022), Technical Specification, 3rd Generation Partnership Project; Technical Specification Group Radio Access Network; NR; Radio Resource Control (RRC) Protocol Specification (Release 17), 1,318 pages.

European Office Action issued in corresponding European Patent Application No. 23 212 240.8-1206 on May 22, 2025.

* cited by examiner

HARQ ID 1

PUCCH
ACK

HARQ ID 2

PUCCH
NACK

HARQ ID 3

PUCCH
NACK

HARQ ID 2

PUCCH
NACK
CLI

FIG. 2

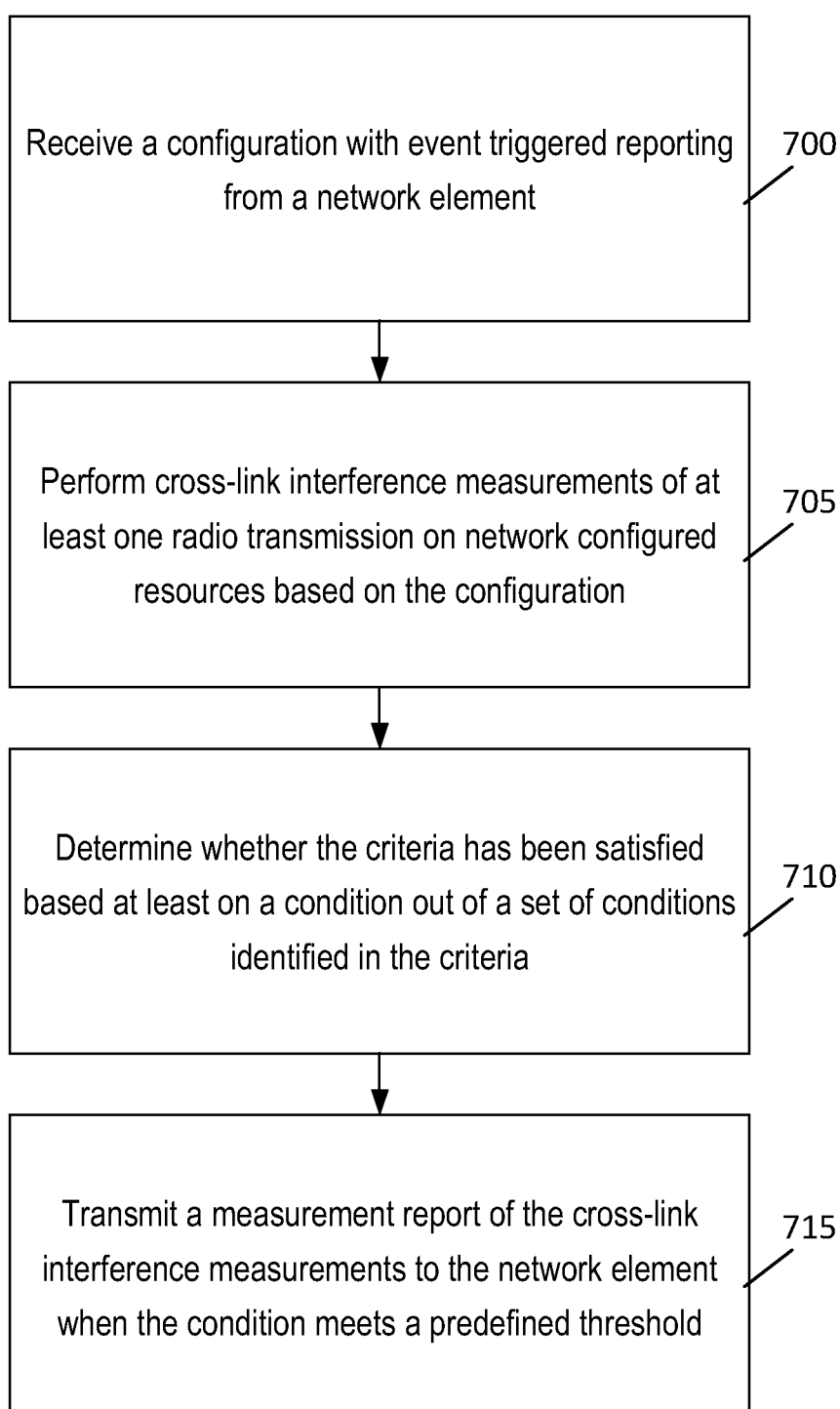

Receive a configuration with event triggered reporting from a network element    700

Perform cross-link interference measurements of at least one radio transmission on network configured resources based on the configuration    705

Determine whether the criteria has been satisfied based at least on a condition out of a set of conditions identified in the criteria    710

Transmit a measurement report of the cross-link interference measurements to the network element when the condition meets a predefined threshold    715

FIG. 7

EVENT-TRIGGERED CROSS-LINK INTERFERENCE MEASUREMENT REPORTING

FIELD

Some example embodiments may generally relate to mobile or wireless telecommunication systems, such as Long Term Evolution (LTE) or fifth generation (5G) new radio (NR) access technology, or 5G beyond, or other communications systems. For example, certain example embodiments may relate to apparatuses, systems, and/or methods for event-triggered cross-link interference (CLI) measurement reporting.

BACKGROUND

Examples of mobile or wireless telecommunication systems may include the Universal Mobile Telecommunications System (UMTS) Terrestrial Radio Access Network (UTRAN), LTE Evolved UTRAN (E-UTRAN), LTE-Advanced (LTE-A), MulteFire, LTE-A Pro, and/or fifth generation (5G) radio access technology or NR access technology. 5G wireless systems refer to the next generation (NG) of radio systems and network architecture. 5G network technology is mostly based on new radio (NR) technology, but the 5G (or NG) network can also build on E-UTRAN radio. It is estimated that NR may provide bitrates on the order of 10-20 Gbit/s or higher, and may support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the IoT.

SUMMARY

Some example embodiments may be directed to a method. The method may include receiving a configuration with event triggered reporting from a network element. According to certain example embodiments, the configuration may specify criteria for triggering a cross-link interference measurement reporting. The method may also include performing cross-link interference measurements of at least one radio transmission on network configured resources based on the configuration. The method may further include determining whether the criteria has been satisfied based at least on a condition out of a set of conditions identified in the criteria. In addition, the method may include transmitting a measurement report of the cross-link interference measurements to the network element when the condition meets a predefined threshold.

Other example embodiments may be directed to an apparatus. The apparatus may include at least one processor and at least one memory including computer program code. The at least one memory and computer program code may also be configured to, with the at least one processor, cause the apparatus at least to receive a configuration with event triggered reporting from a network element. According to certain example embodiments, the configuration may specify criteria for triggering a cross-link interference measurement reporting. The apparatus may also be caused to perform cross-link interference measurements of at least one radio transmission on network configured resources based on the configuration. The apparatus may further be caused to determine whether the criteria has been satisfied based at least on a condition out of a set of conditions identified in the criteria. In addition, the apparatus may be caused to transmit a measurement report of the cross-link interference measurements to the network element when the condition meets a predefined threshold.

Other example embodiments may be directed to an apparatus. The apparatus may include means for receiving a configuration with event triggered reporting from a network element. According to certain example embodiments, the configuration may specify criteria for triggering a cross-link interference measurement reporting. The apparatus may also include means for performing cross-link interference measurements of at least one radio transmission on network configured resources based on the configuration. The apparatus may further include means for determining whether the criteria has been satisfied based at least on a condition out of a set of conditions identified in the criteria. In addition, the apparatus may include means for transmitting a measurement report of the cross-link interference measurements to the network element when the condition meets a predefined threshold.

In accordance with other example embodiments, a non-transitory computer readable medium may be encoded with instructions that may, when executed in hardware, perform a method. The method may include receiving a configuration with event triggered reporting from a network element. According to certain example embodiments, the configuration may specify criteria for triggering a cross-link interference measurement reporting. The method may also include performing cross-link interference measurements of at least one radio transmission on network configured resources based on the configuration. The method may further include determining whether the criteria has been satisfied based at least on a condition out of a set of conditions identified in the criteria. In addition, the method may include transmitting a measurement report of the cross-link interference measurements to the network element when the condition meets a predefined threshold.

Other example embodiments may be directed to a computer program product that performs a method. The method may include receiving a configuration with event triggered reporting from a network element. According to certain example embodiments, the configuration may specify criteria for triggering a cross-link interference measurement reporting. The method may also include performing cross-link interference measurements of at least one radio transmission on network configured resources based on the configuration. The method may further include determining whether the criteria has been satisfied based at least on a condition out of a set of conditions identified in the criteria. In addition, the method may include transmitting a measurement report of the cross-link interference measurements to the network element when the condition meets a predefined threshold.

Other example embodiments may be directed to an apparatus that may include circuitry configured to receive a configuration with event triggered reporting from a network element. According to certain example embodiments, the configuration may specify criteria for triggering a cross-link interference measurement reporting. The apparatus may also include circuitry configured to perform cross-link interference measurements of at least one radio transmission on network configured resources based on the configuration. The apparatus may further include circuitry configured to determine whether the criteria has been satisfied based at least on a condition out of a set of conditions identified in the criteria. In addition, the apparatus may include circuitry configured to transmit a measurement report of the cross-link interference measurements to the network element when the condition meets a predefined threshold.

Certain example embodiments may be directed to a method. The method may include configuring a user equipment with a configuration of event triggered reporting. According to certain example embodiments, the configuration may specify criteria for triggering a cross-link interference measurement reporting. The method may also include receiving a measurement report of cross-link interference measurements from the user equipment. The method may further include applying a mechanism to remove or mitigate user equipment to user equipment cross-link interference upon receiving the measurement report.

Other example embodiments may be directed to an apparatus. The apparatus may include at least one processor and at least one memory including computer program code. The at least one memory and computer program code may be configured to, with the at least one processor, cause the apparatus at least to configure a user equipment with a configuration of event triggered reporting. According to certain example embodiments, the configuration may specify criteria for triggering a cross-link interference measurement reporting. The apparatus may also be caused to receive a measurement report of cross-link interference measurements from the user equipment. The apparatus may further be caused to apply a mechanism to remove or mitigate user equipment to user equipment cross-link interference upon receiving the measurement report.

Other example embodiments may be directed to an apparatus. The apparatus may include means for configuring a user equipment with a configuration of event triggered reporting. According to certain example embodiments, the configuration may specify criteria for triggering a cross-link interference measurement reporting. The apparatus may also include means for receiving a measurement report of cross-link interference measurements from the user equipment. The apparatus may further include means for applying a mechanism to remove or mitigate user equipment to user equipment cross-link interference upon receiving the measurement report.

In accordance with other example embodiments, a non-transitory computer readable medium may be encoded with instructions that may, when executed in hardware, perform a method. The method may include configuring a user equipment with a configuration of event triggered reporting. According to certain example embodiments, the configuration may specify criteria for triggering a cross-link interference measurement reporting. The method may also include receiving a measurement report of cross-link interference measurements from the user equipment. The method may further include applying a mechanism to remove or mitigate user equipment to user equipment cross-link interference upon receiving the measurement report.

Other example embodiments may be directed to a computer program product that performs a method. The method may include configuring a user equipment with a configuration of event triggered reporting. According to certain example embodiments, the configuration may specify criteria for triggering a cross-link interference measurement reporting. The method may also include receiving a measurement report of cross-link interference measurements from the user equipment. The method may further include applying a mechanism to remove or mitigate user equipment to user equipment cross-link interference upon receiving the measurement report.

Other example embodiments may be directed to an apparatus that may include circuitry configured to configure a user equipment with a configuration of event triggered reporting. According to certain example embodiments, the configuration may specify criteria for triggering a cross-link interference measurement reporting. The apparatus may also include circuitry configured to receive a measurement report of cross-link interference measurements from the user equipment. The apparatus may further include circuitry configured to apply a mechanism to remove or mitigate user equipment to user equipment cross-link interference upon receiving the measurement report.

BRIEF DESCRIPTION OF THE DRAWINGS

For proper understanding of example embodiments, reference should be made to the accompanying drawings, wherein:

FIG. 2 illustrates an example of an event-triggered reporting with criteria A and N=2, according to certain example embodiments.

FIG. 7 illustrates an example signal flow diagram of a method, according to certain example embodiments.

DETAILED DESCRIPTION

Figure 1:
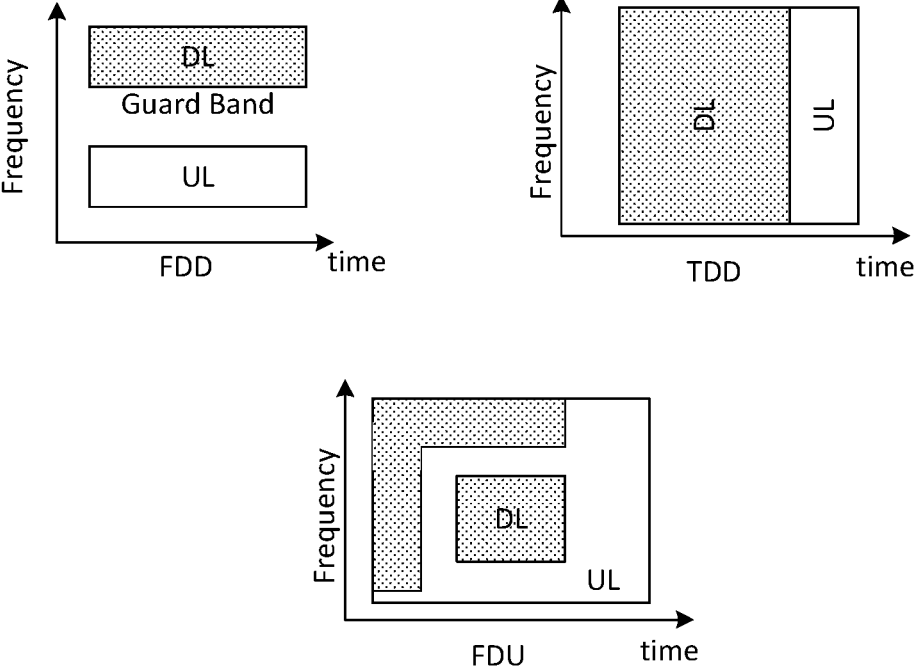
FIG. 1 illustrates an example frequency-time resource partitioning with flexible duplexing (FDU) as compared to traditional frequency division duplex (FDD) and time division duplex (TDD).

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for event-triggered cross-link interference (CLI) measurement reporting. For instance, certain example embodiments may be directed to signaling for event-triggered user equipment-to-user equipment (UE-to-UE) CLI measurement reporting.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "base station", "cell", "node", "gNB", "network" or other similar language throughout this specification may be used interchangeably.

As used herein, "at least one of the following: <a list of two or more elements>" and "at least one of <a list of two or more elements>" and similar wording, where the list of two or more elements are joined by "and" or "or," mean at least any one of the elements, or at least any two or more of the elements, or at least all the elements.

The technical specifications of the Third Generation Partnership Project (3GPP) have considered various enhancements for dynamic time division duplex (TDD) and subband non-overlapping full duplex (SBFD). In the context of UE-to-UE CLI mitigation, 3GPP has considered potential enhancements including, for example, Layer 1/Layer 2 (L1/L2) UE-to-UE CLI reporting, periodic, semi-persistent, or aperiodic reporting, and L1/L2 UE-to-UE CLI measurement, periodic, semi-persistent, or aperiodic measurement resource.

As described herein, certain example embodiments may relate to the evolution of 3GPP NR, which currently supports two duplexing modes: frequency division duplex (FDD) for paired bands; and TDD for unpaired bands. In TDD, the time domain resources may be split between downlink (DL) and uplink (UL). Current 5G deployments may use static TDD with a DL-heavy frame configuration, and this may be coordinated between different operators. Even though the NR specifications may allow for higher flexibility than this, operators may be recommended to follow a common frame structure to avoid cross inter-operator interference. Selecting a DL-heavy frame configuration implies a limited time duration for the UL in TDD, which may result in reduced uplink coverage, increased latency, and reduced uplink capacity.

Due to increasing demand for supporting applications with high requirements in UL throughput, 3GPP has considered new duplexing methods that may address the aforementioned challenges. For instance, FIG. 1 illustrates an example frequency-time resource partitioning with full duplexing (FDU) as compared to traditional FDD and TDD. Please note that FDU may be refereed as SBFD. In particular, as illustrated in FIG. 1, it has been considered to allow simultaneous DL and UL transmissions on different physical resource blocks (PRBs) within an unpaired wideband NR carrier. In certain example embodiments described herein, the example of FIG. 1 may be referred to as FDU or full duplex. Additionally, there has been considerations in 3GPP to design a framework that allows practical/real deployments to adopt dynamic TDD. In both approaches, the CLI has been identified as a clear bottleneck that can completely remove the theoretical benefits of dynamic TDD or FDU.

Various CLI scenarios may exist in 3GPP. For instance, 3GPP may consider gNB self-interference (FDU specific), UE-to-UE CLI (common to FDU and dynamic TDD), and gNB-to-gNB CLI (common to FDU and dynamic TDD). Within the CLI components common to FDU and dynamic TDD, the experienced UE-to-UE and gNB-to-gNB CLI may be generated by either i) non-overlapping resource blocks (RBs), in which case the CLI may be denoted as inter-subband interference (FDU-specific), or ii) overlapping RBs, in which case the CLI may be known as intra-subband interference (common to FDU and dynamic TDD). As discussed herein, certain example embodiments may handle the intra-subband interference. For instance, certain example embodiments may relate to UE-to-UE CLI, where DL reception of one UE may be interfered by the UL transmission of a neighboring UE.

Currently, the standardized Rel-16 CLI management framework allows UEs to perform two types of measurements including, for example, sounding reference signal-reference signal received power (SRS-RSRP) measurement in which the UE measures SRS-RSRP over SRS resources of aggressor UE(s). Another type of measurement may include a CLI-received signal strength indicator (CLI-RSSI) measurement in which the UE measures the total received power observed over configured measurement resources.

In both cases of CLI measurements described above, L3 filtering may be applied to the measurement samples. Moreover, periodic and event-triggered reporting may be supported. With regard to event-triggered reporting, a I1 event may be configured to trigger the CLI measurement reporting. According to 3GPP, the I1 event may be defined as interference that becomes higher than an absolute threshold. For instance, for an event I1, the measurement reporting event may be based on CLI measurement results, which may either be derived based on SRS-RSRP or CLI-RSSI. The measured CLI samples (e.g., SRS-RSRP) may be mapped to a report value.

Applying L3 filtering may inherently add a delay to the measurement procedure, and it may reflect the long-term characteristics on the CLI. Moreover, the reporting may occur at the L3 level, which means that fast adaptation based on the CLI conditions is not feasible. Given these restrictions, 3GPP has considered L1/L2 measurements and reporting.

Based on the challenges described above, 3GPP may consider L1/L2 UE-to-UE CLI reporting enhancements. 3GPP may also consider a case where event-triggered reporting may depend on a pre-configured absolute threshold ("event I1"), which may lead to undesirable behaviors. For instance, if the threshold for triggering the I1 event is configured to a very high value, a UE may be affected by CLI, but the serving gNB may be unaware of the UE's situation since the reporting is hardly triggered. This may be likely to cause performance degradation in DL since many packets would not be successfully decoded due to high interference conditions. On the other hand, setting a very low threshold may trigger unnecessary measurement reports which increases the UE computational efforts as well as the overhead, which may cause reduced spectral efficiency in UL.

Given the above, certain example embodiments may leverage from L1/L2 UE-to-UE CLI measurement and reporting, and provide new triggers for event-triggered CLI measurements and the signaling required to enable UE-to-UE CLI measurement and reporting. For instance, in certain example embodiments, the UE may be configured to perform periodic CLI measurements based on SRS-RSRP or CLI-RSSI resources. The UE may also be configured with event-triggered reporting where the trigger event may be based on the decoding rate of a downlink signal (denoted as event I2). The pre-configured downlink signal can be the physical downlink control channel (PDCCH), the physical downlink shared channel (PDSCH) or any other DL signal. In other example embodiments, the UE may perform periodic measurements on the configured resources, and track a DL signal failure rate. The DL signal failure rate comprises a PDSCH failure rate in case PDSCH is the DL signal to be monitored. The DL signal failure rate comprises a PDCCH failure rate in case PDCCH is the DL signal to be monitored. In some example embodiments, the measurement report provided by the UE may be triggered once a certain criteria is satisfied or is matched. For instance, in certain example embodiments, the criteria may be a set of conditions, wherein the decoding rate of a channel greater than or less than a threshold may be one condition in the set. Another condition may be, for example, a threshold on the measured CLI, or a time duration from the previous report is greater than a threshold. The measurement report may be transmitted by the UE to the gNB. Upon reception of the report, the gNB may apply mechanisms to remove or mitigate the UE-to-UE CLI. For instance, in some example embodiments, the gNB may apply coordination with a neighbor cell that is causing the CLI, or the gNB may adjust its scheduling decisions based on the reported CLI.

As described above, certain example embodiments may provide new criteria for event-triggered CLI reporting. For instance, in event-triggered UE-to-UE CLI reporting, the UE may be configured to perform CLI measurements based on SRS-RSRP or CLI-RSSI resources. In some example embodiments, the CLI measurements performed by the UE may be configured via radio resource control (RRC) signaling (MeasObjectCLI). In other example embodiments, the UE may be configured (via RRC signaling) with event triggered reporting. The parameter CLI-EventTriggerConfig within ReportConfigNR may specify the criteria for triggering an NR measurement reporting event based on CLI measurements performed by the UE.

In certain example embodiments, certain events may be defined depending on the criteria. For instance, one event may be defined based on a comparison between a measured CLI level and an absolute threshold (event I1-r16 in CLI-EventTriggerConfig). In other example embodiments, another event may be defined based on a PDSCH decoding rate (event I2-r18 in CLI-EventTriggerConfig).

Figure 2:
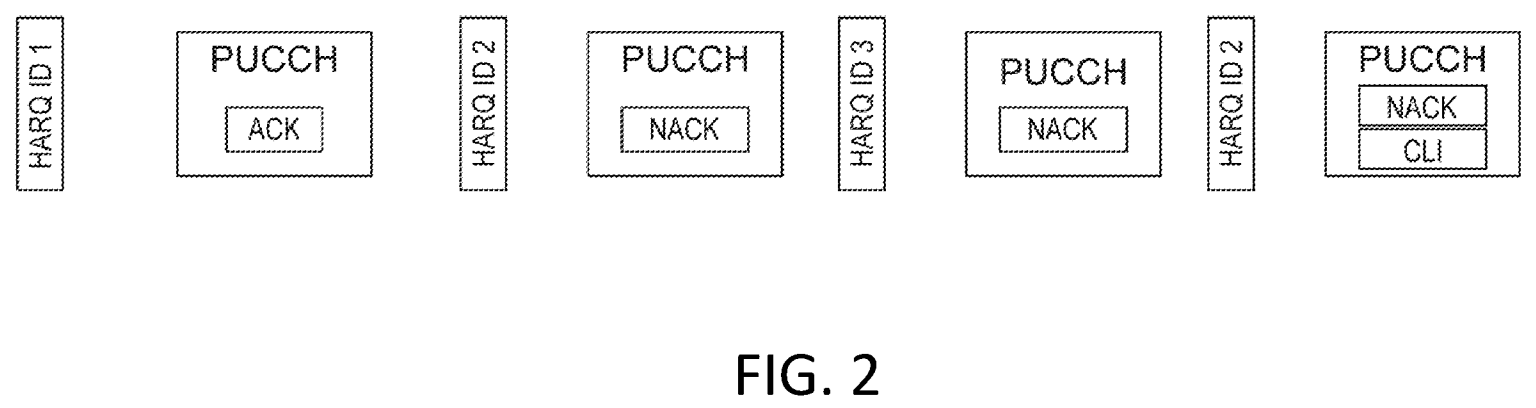

According to certain example embodiments, there may be different criteria for how to measure the PDSCH decoding rate (e.g., DL channel and/or signal decoding rate). For instance, one criteria A, the UE may be configured to report the measured CLI after it fails N times to decode the PDSCH transmissions associated with a given hybrid automatic repeat request (HARQ) process identifier (ID) (m). For instance, FIG. 2 illustrates an example of an event-triggered reporting with criteria A and N=2, according to certain example embodiments. As illustrated in FIG. 2, the HARQ processing ID 2 triggers the measurement report. According to some example embodiments, once the reporting of the measured CLI is triggered, the counter of failures of N may reset, and a timer accounting for the time interval between the two consecutive reports may also be reset.

In some example embodiments, the UE may account for failures in all the slots with PDSCH transmissions or only for the PDSCH failures during slots where CLI is potentially present (i.e., CLI slots). In such a case, the UE may assume that all the slots/symbols defined as "flexible" in the TDD-UL-DL-ConfigCommon TDD-UL-DL-ConfigDedicated are considered as CLI slots. Alternatively, in other example embodiments, the gNB may semi-statically indicate which slots are considered as CLI after using the already standardized exchange of TDD frame configurations among the base stations over an Xn interface (XnAP signaling: Intended TDD) DL-UL Configuration NR).

In some example embodiments the threshold N (i.e., number of decoding failures) may be configured to be lower than a maximum number of retransmissions for a particular HARQ process ID such that the UE provides the gNB with useful information for future scheduling decisions before the transport block (TB) needs to be dropped. In other example embodiments, the threshold N may be hard-coded in the specifications or semi-statically configured (i2-N-number-of-attempts-r18). The gNB may configure the threshold N via RRC, using, for example, the existing RRC IE CLI-EventTriggerConfig, medium access control-control element (MAC-CE) or downlink control information (DCI). With regard to how the threshold is configured, determining which alternative to use may depend on the needs for fast trigger adaptation.

According to certain example embodiments, the threshold N may be associated with a modulation coding scheme (MCS) index. For example, different values of N may be associated with different rages of MCS levels. In some example embodiments, N may be decreased if the selected MCS for the PDSCH transmission is robust (range of low MCS index) compared to an aggressive MCS selection (range of high MCS index) where N may be increased. This may be useful in cases where the selected MCS is already quite low but the CLI is still hindering the transmission. The gNB may then rapidly apply different schemes such as coordination to avoid CLI.

Figure 3:
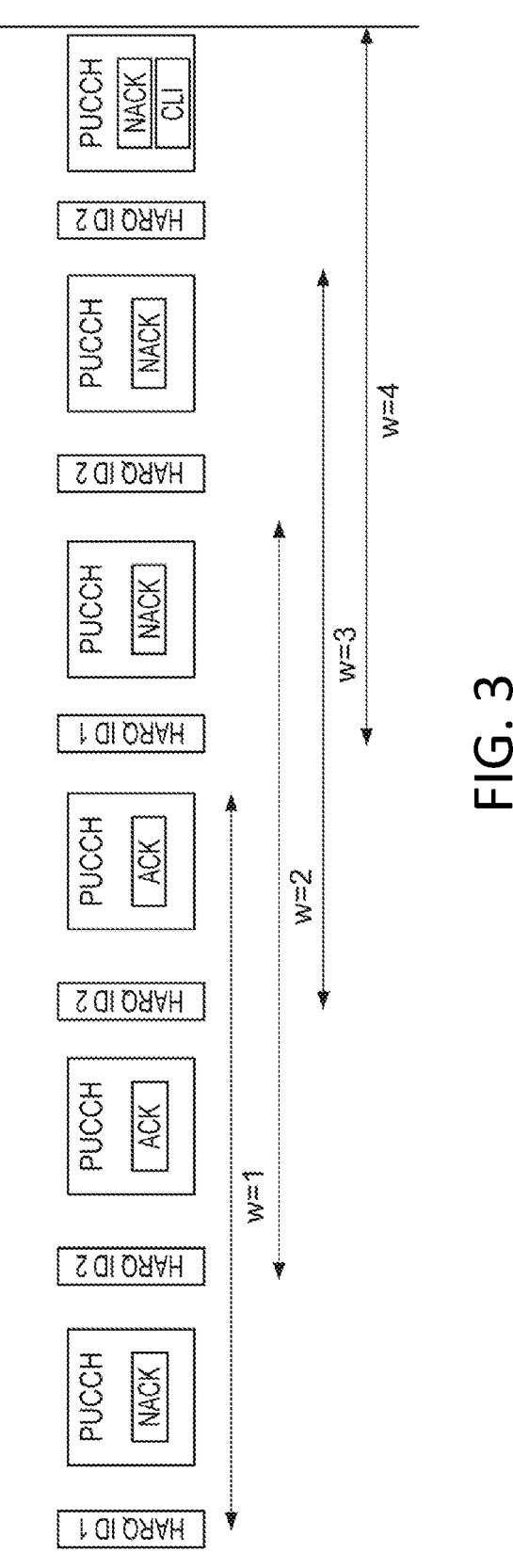
FIG. 3 illustrates an example of event-triggered reporting with criteria B with N=2, and a sliding monitoring window (w), according to certain example embodiments.

In other example embodiments, another criteria such as, for example, criteria B, may involve the UE being configured to report the measured CLI after it fails N times to decode any PDSCH transmissions associated with any of the available HARQ process IDs (M). For instance, FIG. 3 illustrates an example of event-triggered reporting with criteria B with N=2, and a sliding monitoring window (w), according to certain example embodiments. Similar to criteria A described above, the UE may be configured to account for all the PDSCH transmissions regardless of whether they are impacted by CLI or not, or only configured to monitor the PDSCH failures during CLI slots. The UE may also track the accumulated PDSCH decoding failures over a certain time interval. As illustrated in FIG. 3, a monitoring window (w) may be configured for the UE while it is tracking the accumulated PDSCH decoding failures (i2-time-window-r18). In certain example embodiments, the monitoring window (w) may be configured and known at the UE. This duration may be configured in terms of milliseconds or number of slots. In other example embodiments, two consecutive monitoring windows may be overlapping (i.e., sliding window) or non-overlapping (i.e., a new window starts at the end of the previous window). In other example embodiments, the monitoring window duration may be used to reset the PDSCH failures counter.

According to certain example embodiments, the monitoring window duration of the monitoring window and the threshold N may be dynamically adjusted according to current CLI conditions. The gNB may benefit from the dynamic adjustment as it allows the gNB to receive more frequency CLI reports of UEs that are currently experiencing high CLI. To make this possible, the UE may shorten its monitoring window (i.e., time window (w)) and decrease N if M consecutive windows have previously triggered a CLI report. On the other hand, if P consecutive windows have not previously triggered a CLI report, the UE may increase the length of the monitoring window, and set N to a higher value (i.e., increase N). In some example embodiments, the UE may be configured with a N step size (i2-N-step-size-r18), which may indicate the parameter to calculate a new threshold and, a monitoring window back-off time (i2-time-win-dowBackOff-r18), which may indicate the parameter to calculate the new monitoring window duration. Additionally, the number of consecutive windows with and without reporting (M and P) should be configured (i2-consecutive-Windows_Reporting-r18 and i2-consectuvieWindows_WithoutReporting-r18). In other example embodiments, for a UE to be able to differentiate which criteria to apply, an indication may be provided to determine which criteria is configured (i2-criteria-r18), or the UE may assume criteria B if i2-window-duration-r18 is provided as part of the configuration. Upon reception of the report, the gNB may apply mechanisms to remove or mitigate the UE-to-UE CLI.

Figure 4:
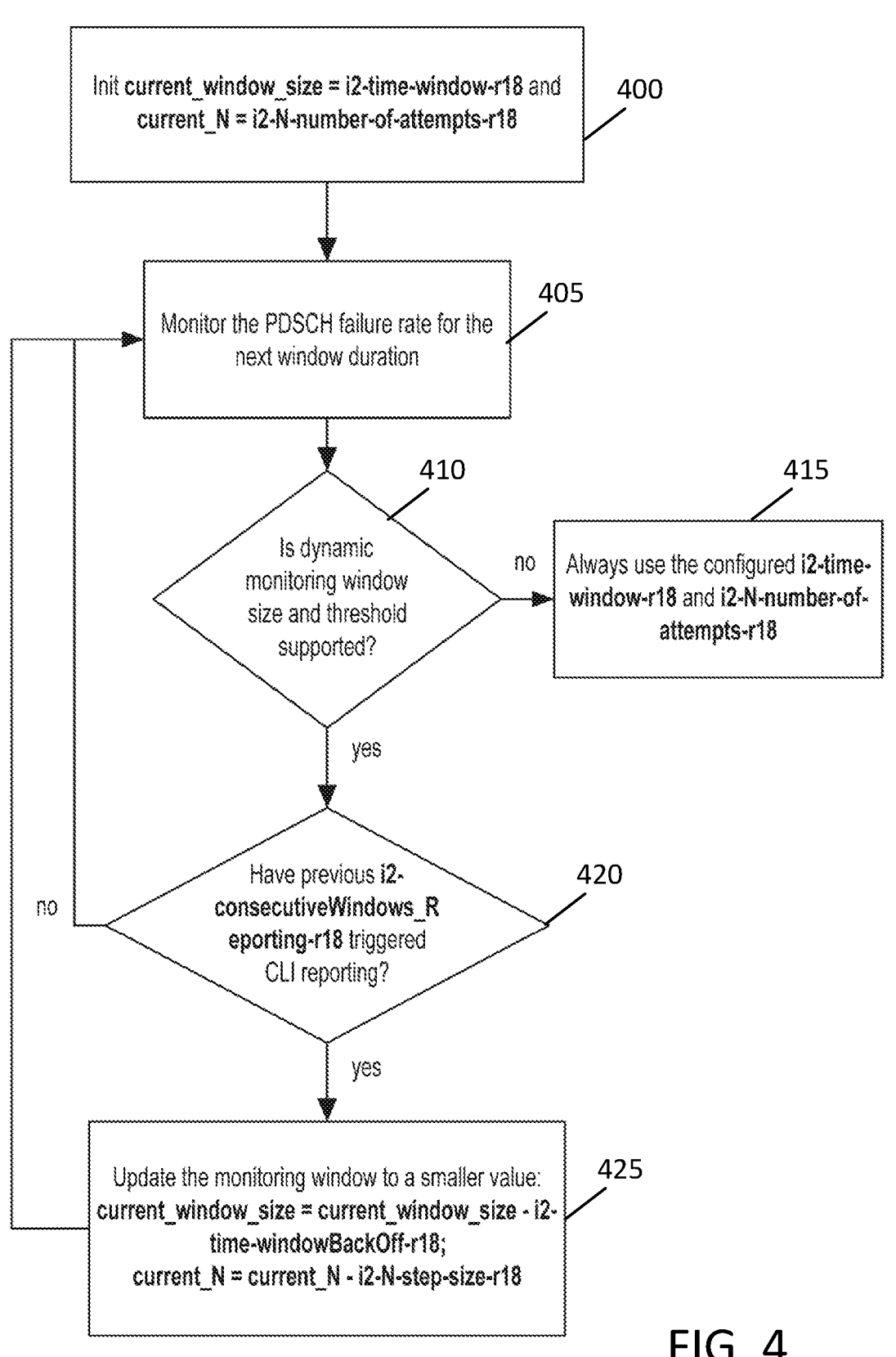
FIG. 4 illustrates an example flow diagram of a dynamic adjustment of the monitoring window and N when the UE experiences frequency CLI, according to certain example embodiments.

FIG. 4 illustrates an example flow diagram of a dynamic adjustment of the monitoring window and N when the UE experiences frequency CLI, according to certain example embodiments. For instance, at 400, the initial current window size may be i2-time-window-r18, and the current N value may be i2-N-number-of-attempts-r18. At 405, the UE may monitor the PDSCH failure rate for the next window duration. At 410, the UE may determine whether dynamic monitoring window size and threshold N is supported. If dynamic monitoring window size and threshold N is not supported, at 415, the UE may use the configured i2-window-duration-r18 and i2-N-number-of-attempts-r18. However, if dynamic window size and threshold N is supported, at 420, the UE may determine whether a previous i2-consecutive Windows_Reporting-r18 triggered CLI reporting. If no, the UE may return to monitoring the PDSCH failure rate for the next window duration at 405. However, if the previous i2-consecutiveWindows_Reporting-r18 triggered CLI reporting, at 425, the UE may update the monitoring window by decreasing the monitoring window value: current window size=current window size−i2-time-window-BackOff-r18; current N=current N−i2-N-step-size-r18.

Figure 5:
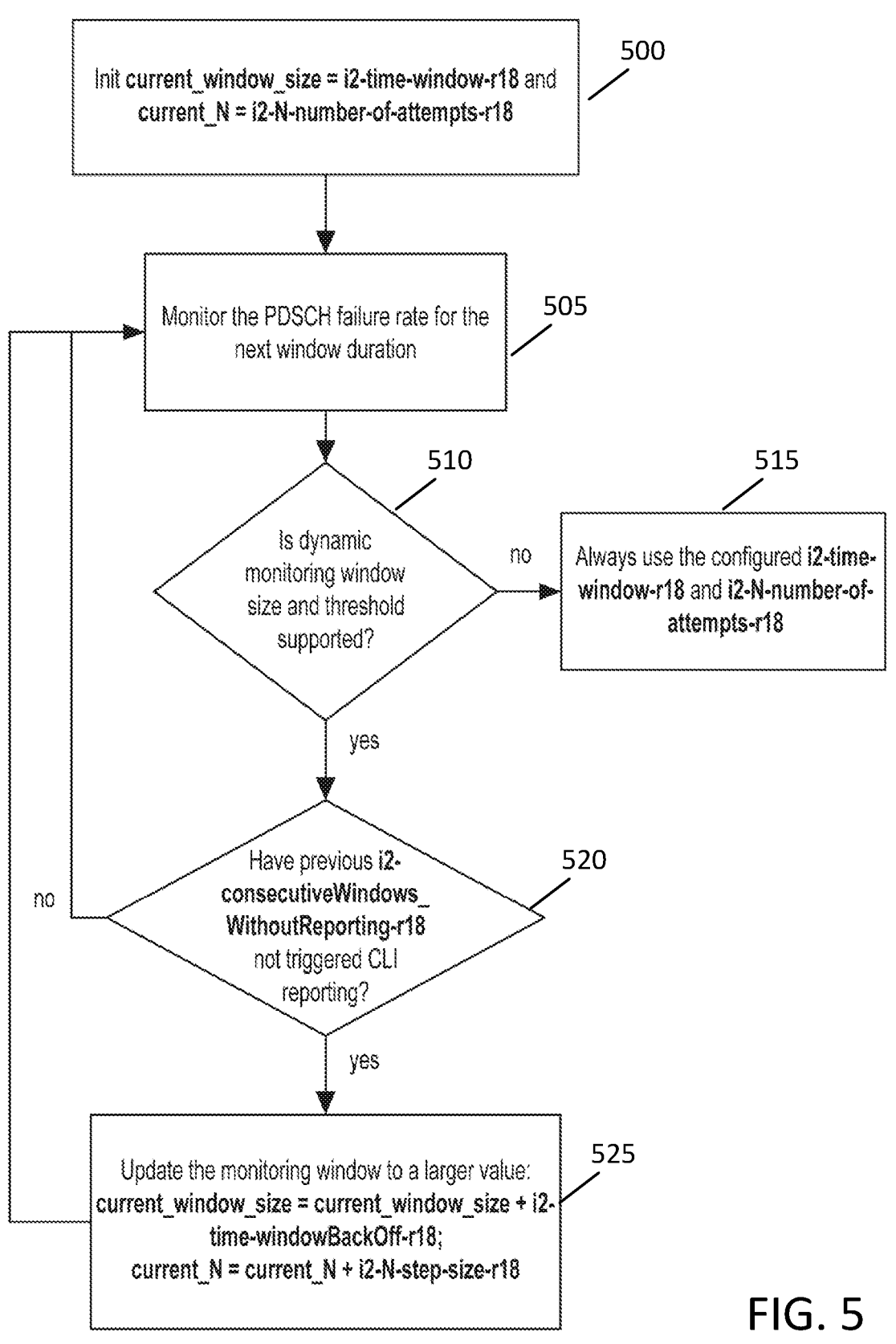
FIG. 5 illustrates an example flow diagram of another dynamic adjustment of the monitoring window and N when the UE does not experience frequent CLI, according to certain example embodiments.

FIG. 5 illustrates an example flow diagram of another dynamic adjustment of the monitoring window and N when the UE does not experience frequent CLI, according to certain example embodiments. For instance, at 500, the initial current window size may be i2-window-duration-r18 and the current N value may be i2-N-number-of-attempts-r18. At 505, the UE may monitor the PDSCH failure rate for the next window duration. At 510, the UE may determine whether dynamic monitoring window size and threshold N is supported. If dynamic monitoring window size and threshold N is not supported, at 515, the UE may use the configured i2-window-duration-r18 and i2-N-number-of-attempts-r18. However, if dynamic window size and threshold N is supported, at 520, the UE may determine whether a previous i2-consecutiveWindows_Reporting-r18 has not triggered CLI reporting. If no, the UE may return to monitoring the PDSCH failure rate for the next window duration at 505. However, if the previous i2-consecutiveWindows_Reporting-r18 did not trigger CLI reporting, at 525, the UE may update the monitoring window by increasing the monitoring window value: current window size=current window size+I2-time-window BackOff-r18; current N=current N+i2-N-step-size-r18.

As previously described, once a criterion is fulfilled at the UE for the measurement report, the UE may transmit the report to the gNB. In certain example embodiments, the UE may report the measured CLI on the PUCCH that carries the HARQ feedback (NACK) from the N-th PDSCH (i.e., the one which triggered the reporting). In some example embodiments, when HARQ-ACK codebook is used, the binary sequence for CLI reporting may be added after the NACK bit for the Nth PDSCH in HARQ-ACK codebook. Alternatively, the binary sequence for CLI reporting may be added at the end of the HARQ-ACK codebook that includes the NACK bit for the Nth PDSCH.

Figure 6:
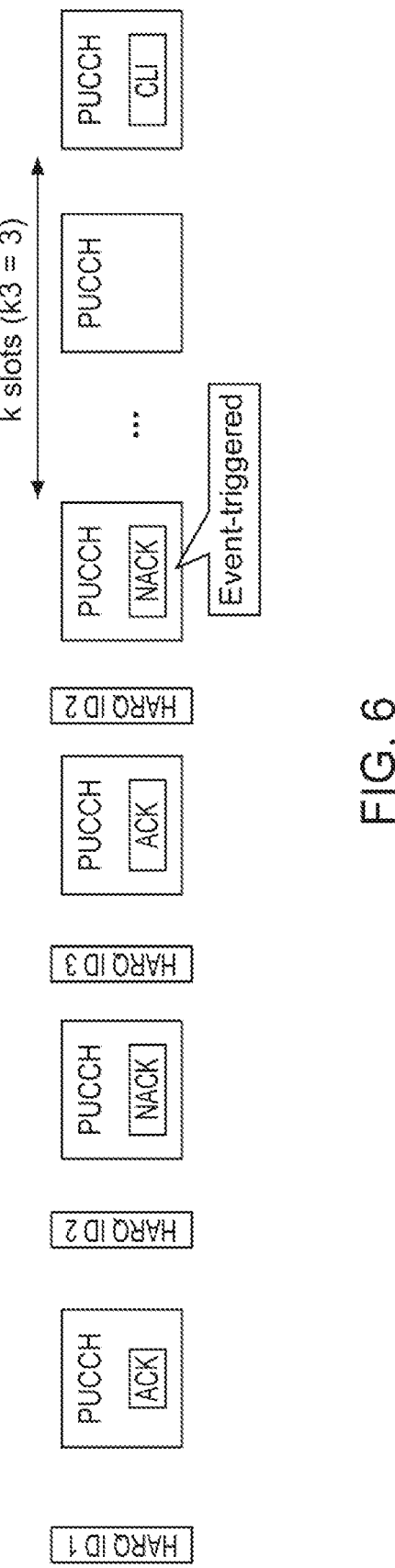
FIG. 6 illustrates an example hybrid automatic repeat request (HARQ) feedback and measurement report transmitted independently with an offset between them of M slots, according to certain example embodiments.

According to other example embodiments, the UE may report the measured CLI on an independent PUCCH from the PUCCH carrying the NACK feedback. Specifically, the UE may report CLI on the PUCCH resource that is k slots after the slot that triggered the measurement report. For example, similar to the k1 parameter to indicate where the gNB is expecting to receive the HARQ feedback (PDSCH-to-HARQ-timing-indicator), the UE may be configured with, for example, a k3 parameter (HARQ-to-report-timing-indicator), to indicate when the UE should perform the reporting. In this regard, FIG. 6 illustrates an example HARQ feedback and measurement report transmitted independently with an offset between them of M slots, according to certain example embodiments. As illustrated in FIG. 6, the NACK and CLI report are transmitted with a predefined slot offset such as, for example, 3 slots after the Nth NACK are transmitted.

In other example embodiments, the UE may report CLI on the PUCCH resource in the latest available UL slot after the slot where the UE reports the NACK bit for the Nth PDSCH (or after the slot where the UE receives the Nth PDSCH). In certain example embodiments, if the CLI report is transmitted on an independent PUCCH from the HARQ feedback, the UE may consider CLI as uplink control information (UCI), and determine PUCCH resources for reporting CLI in the same way as doing that for UCI reporting. For example, this may include determining a PUCCH resource set based on CLI report size and determining PUCCH resource within the group based on PUCCH resource indicator (PRI) from the DCI scheduling the latest PDSCH. Alternatively, in other example embodiments, the CLI size (and hence PUCCH resource set) and/or PRI may be fixed (e.g., semi-statically configured).

According to certain example embodiments, the UE may alternatively report the measured CLI using PUSCH. In such a case, the binary sequence for CLI reporting may be piggybacked on the first PUSCH after the N-th PDSCH. In some example embodiments, a preconfigured offset value (similar to beta-offset for multiplexing UCI on PUSCH) may be used for calculating the resource for multiplexing CLI on PUSCH. Alternatively, in other example embodiments, the UE may report CLI on a PUSCH when receiving an indicator in the scheduling DCI that triggers the reporting. The new offset value for the multiplexing may be indicated on the scheduling DCI. In further example embodiments, the UE may alternatively report the CLI on a PUSCH when receiving the scheduling DCI that has the new offset value greater than zero.

FIG. 7 illustrates an example flow diagram of a method, according to certain example embodiments. In an example embodiment, the method of FIG. 7 may be performed by a network entity, or a group of multiple network elements in a 3GPP system, such as LTE or 5G-NR. For instance, in an example embodiment, the method of FIG. 7 may be performed by a UE similar to one of apparatuses 10 or 20 illustrated in FIG. 9.

According to certain example embodiments, the method of FIG. 7 may include, at 700, receiving a configuration with event triggered reporting from a network element. According to certain example embodiments, the configuration specifies criteria for triggering a cross-link interference measurement reporting. The method may also include, at 705, performing cross-link interference measurements of at least one radio transmission on network configured resources based on the configuration. The method may further include, at 710, determining whether the criteria has been satisfied based at least on a condition out of a set of conditions identified in the criteria. In addition, the method may include, at 715, transmitting a measurement report of the cross-link interference measurements to the network element when the condition meets a predefined threshold.

According to certain example embodiments, the condition may include at least one of a decoding rate threshold of downlink transmissions, a cross-link interference value threshold, or a time duration threshold. According to some example embodiments, a decoding rate of the decoding rate threshold of downlink transmissions may account for failures in all slots with downlink transmissions, or the decoding rate of the decoding rate threshold of downlink transmissions accounts for downlink transmission failures during slots where cross-link interference is potentially present. In some example embodiments, the method may also include receiving from the network element, an UL grant including scheduling information for the CLI report. In other example embodiments, the measurement report may be transmitted on at least one of a physical uplink control channel resource, or a physical uplink shared channel resource (i.e., according to the UL grant). In further example embodiments, the downlink transmissions may be at least one of PDSCH transmission, PDCCH transmission, channel state information reference signal, demodulation reference signal, tracking reference signal, or phase tracking reference signal.

According to other example embodiments, the criteria for triggering the cross-link interference measurement reporting may include a failure of a number N times to decode a downlink transmission associated with a given hybrid automatic repeat request process identifier.

In certain example embodiments, the criteria for triggering the cross-link interference measurement reporting may include a failure of a number N times to decode any downlink transmissions associated with any available hybrid automatic repeat request process identifiers. In some example embodiments, the method may also include adjusting, by increasing or decreasing, the predetermined number N times to decode any downlink transmissions based on a selected modulation and coding scheme. In other example embodiments, the method may further include tracking a number of downlink transmission decoding failures over a predetermined time interval.

Additionally, in some example embodiments, the method may include dynamically adjusting the predetermined time interval and a number N times to decode a downlink transmission based on a current cross-link interference condition. According to certain example embodiments, the measurement report may be transmitted on at least one of an uplink transmission resource that carries hybrid automatic repeat request feedback from a downlink transmission resource that triggered the transmission of the measurement report, an independent uplink transmission resource from the uplink transmission resource carrying a negative acknowledgment feedback, an uplink transmission resource in a latest available uplink slot after a slot where the negative acknowledgment bit for an Nth downlink transmission resource was reported, or an uplink transmission resource.

Figure 8:
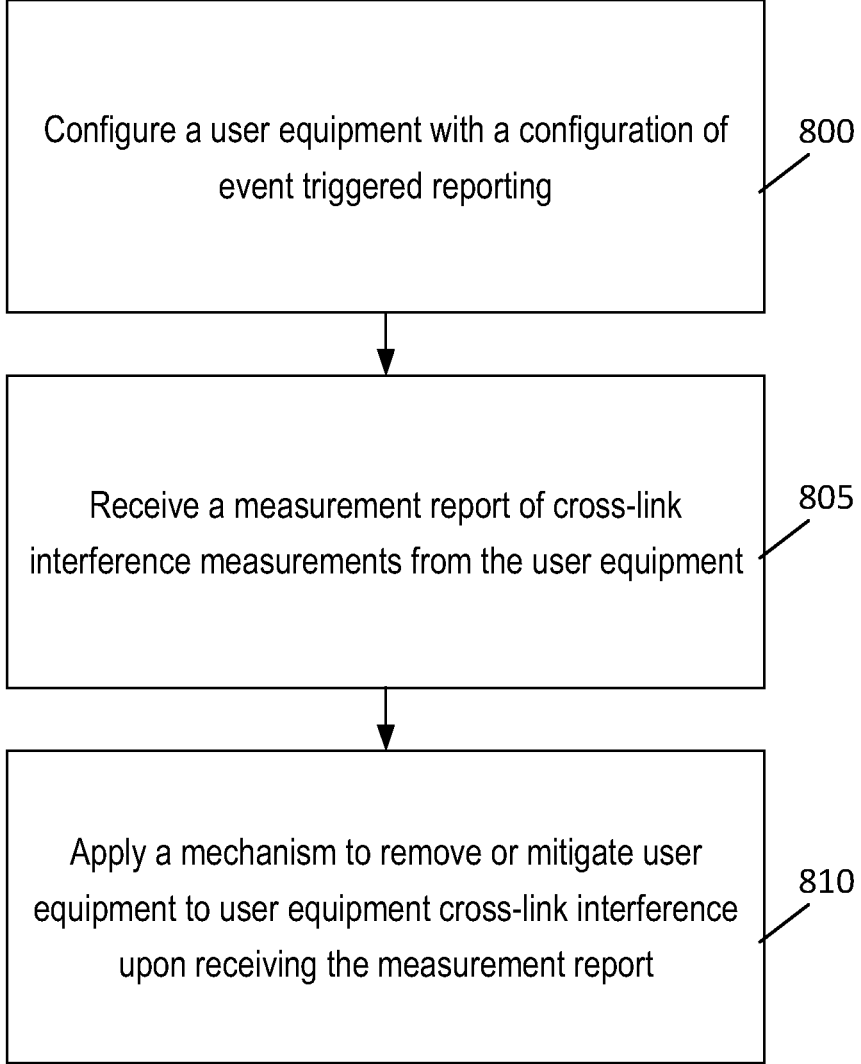
FIG. 8 illustrates an example signal flow diagram of another method according to certain example embodiments.

FIG. 8 illustrates an example flow diagram of another method, according to certain example embodiments. In an example embodiment, the method of FIG. 8 may be performed by a network entity, or a group of multiple network elements in a 3GPP system, such as LTE or 5G-NR. For instance, in an example embodiment, the method of FIG. 8 may be performed by a gNB similar to one of apparatuses 10 or 20 illustrated in FIG. 9.

According to certain example embodiments, the method of FIG. 8 may include, at 800, configuring a user equipment with a configuration of event triggered reporting. According to certain example embodiments, the configuration may specify criteria for triggering a cross-link interference measurement reporting. The method may also include, at 805, receiving a measurement report of cross-link interference measurements from the user equipment. The method may further include, at 810, applying a mechanism to remove or mitigate user equipment to user equipment cross-link interference upon receiving the measurement report.

According to certain example embodiments, the condition may include at least one of a decoding rate threshold of downlink transmissions, a cross-link interference value threshold, or a time duration threshold.

Figure 9:
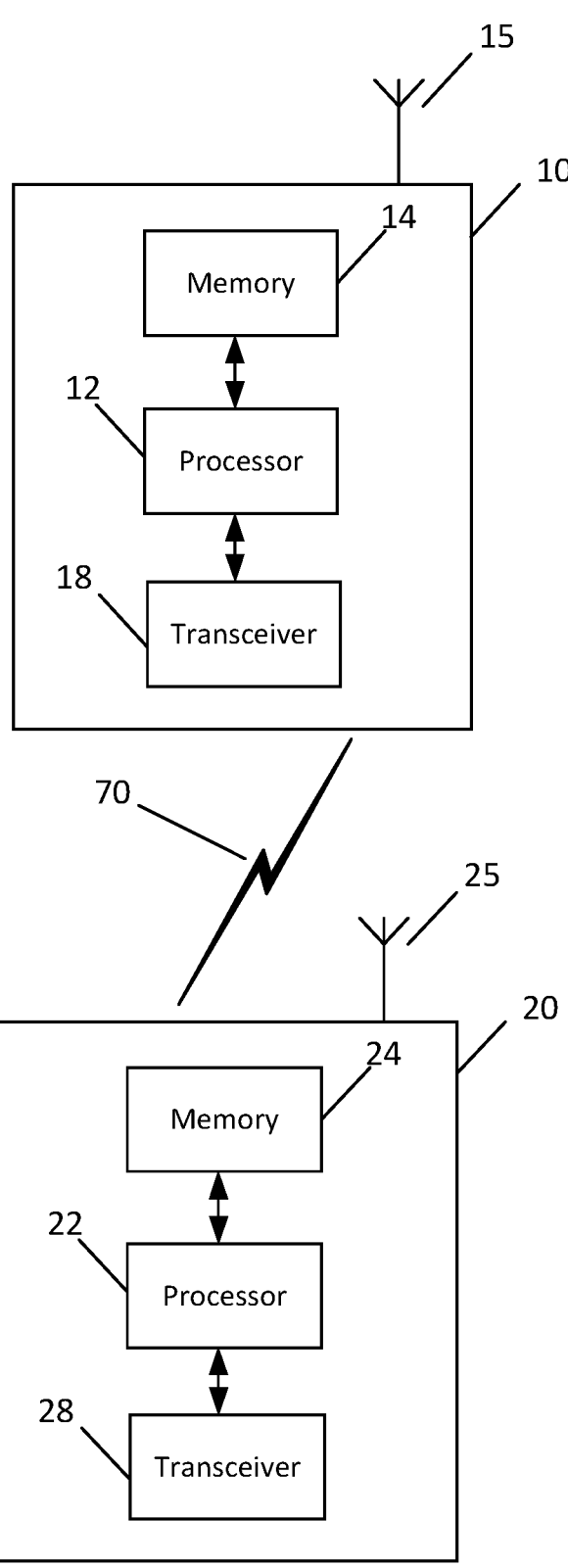
FIG. 9 illustrates a set of apparatuses, according to certain example embodiments.

FIG. 9 illustrates a set of apparatuses 10 and 20 according to certain example embodiments. In certain example embodiments, the apparatus 10 may be an element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 9.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 9.

As illustrated in the example of FIG. 9, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes and examples illustrated in FIGS. 1-8.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12 enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods and examples illustrated in FIGS. 1-8.

In some example embodiments, apparatus 10 may also include or be coupled to one or more antennas 15 for receiving a downlink signal and for transmitting via an UL from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an UL.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to receive a configuration with event triggered reporting from a network element. According to certain example embodiments, the configuration may specify criteria for triggering a cross-link interference measurement reporting. Apparatus 10 may also be controlled by memory 14 and processor 12 to perform cross-link interference measurements of at least one radio transmission on network configured resources based on the configuration. Apparatus 10 may further be controlled by memory 14 and processor 12 to determine whether the criteria has been satisfied based at least on a condition out of a set of conditions identified in the criteria. In addition, apparatus 10 may be controlled by memory 14 and processor 12 to transmit a measurement report of the cross-link interference measurements to the network element when the condition meets a predefined threshold.

As illustrated in the example of FIG. 9, apparatus 20 may be a network, core network element, or element in a communications network or associated with such a network, such as a gNB, BS, cell, or NW. It should be noted that one of ordinary skill in the art would understand that apparatus 20 may include components or features not shown in FIG. 9.

As illustrated in the example of FIG. 9, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes and examples illustrated in FIGS. 1-8.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods and examples illustrated in FIGS. 1-8.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an UL).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

For instance, in certain example embodiments, apparatus 20 may be controlled by memory 24 and processor 22 to configure a user equipment with a configuration of event triggered reporting. According to certain example embodiments, the configuration may specify criteria for triggering a cross-link interference measurement reporting. Apparatus 20 may also be controlled by memory 24 and processor 22 to receive a measurement report of cross-link interference measurements from the user equipment. Apparatus 20 may further be controlled by memory 24 and processor 22 to apply a mechanism to remove or mitigate user equipment to user equipment cross-link interference upon receiving the measurement report.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for receiving a configuration with event triggered reporting from a network element. According to certain example embodiments, the configuration may specify criteria for triggering a cross-link interference measurement reporting. The apparatus may also include means for performing cross-link interference measurements of at least one radio transmission on network configured resources based on the configuration. The apparatus may further include means for determining whether the criteria has been satisfied based at least on a condition out of a set of conditions identified in the criteria. In addition, the apparatus may include means for transmitting a measurement report of the cross-link interference measurements to the network element when the condition meets a predefined threshold.

Certain example embodiments may also be directed to an apparatus that includes means for configuring a user equipment with a configuration of event triggered reporting. According to certain example embodiments, the configuration may specify criteria for triggering a cross-link interference measurement reporting. The apparatus may also include means for receiving a measurement report of cross-link interference measurements from the user equipment. The apparatus may further include means for applying a mechanism to remove or mitigate user equipment to user equipment cross-link interference upon receiving the measurement report.

Certain example embodiments described herein provide several technical improvements, enhancements, and/or advantages. For instance, in some example embodiments, it may be possible to handle intra-subband interference. In other example embodiments, it may be possible to leverage from new L1/L2 UE-to-UE CLI measurement and reporting, and provide new triggers for event-triggered CLI measurements and the signaling required to enable it. According to other example embodiments, it may be possible to adapt to highly variant CLI conditions enabling fast report triggering. Additionally, using an absolute threshold for the I1 event may not be optimal as it might result in over reporting or not reporting at all depending on the configured threshold. Thus, introducing the new events as described herein may provide more flexibility to the gNB on which criteria to rely on. In further example embodiments, it may be possible for the network to configure the periodic CLI reporting with a long period to avoid overhead. The CLI may only be reported when there are practical performance issues due to the event-triggered approach of certain example embodiments.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

| Partial Glossary: | |
|---|---|
| 3GPP | 3rd Generation Partnership Project |
| 5G | 5th Generation |
| 5GCN | 5G Core Network |
| 5GS | 5G System |
| BS | Base Station |
| CLI | Cross-link Interference |
| eNB | Enhanced Node B |
| DCI | Downlink Control Information |
| E-UTRAN | Evolved UTRAN |
| FDU | Flexible Duplexing |
| gNB | 5G or Next Generation NodeB |
| LTE | Long Term Evolution |
| NR | New Radio |
| NW | Network |
| OSI | Other System Information |
| PDCCH | Physical Downlink Control Channel |
| PRI | PUCCH Resource Indicator |
| PUCCH | Physical Uplink Control Channel |
| PUSCH | Physical Uplink Shared Channel |
| RACH | Random Access Channel Procedure |
| RSRP | Reference Signal Received Power |
| SI | System Information |
| SIB | System Information Block |
| SRS | Sounding Reference Signal |
| SSB | Synchronization Signal Block |
| UCI | Uplink Control Information |
| UE | User Equipment |
| UL | Uplink |

We claim:

1. A method comprising:

receiving a configuration with event triggered reporting from a network element, wherein the configuration specifies criteria for triggering a cross-link interference measurement reporting;

performing cross-link interference measurements of at least one radio transmission on network configured resources based on the configuration;

determining whether the criteria has been satisfied based at least on a condition out of a set of conditions identified in the criteria, wherein the condition comprises a decoding rate threshold of downlink transmissions; and transmitting a measurement report of the cross-link interference measurements to the network element when the condition meets a predefined threshold, wherein a decoding rate of the decoding rate threshold of downlink transmissions accounts for downlink transmission failures during slots where cross-link interference is potentially present, wherein the measurement report is transmitted on at least one of the following:

an uplink transmission resource that carries hybrid automatic repeat request feedback from a downlink transmission resource that triggered the transmission of the measurement report, an independent uplink transmission resource from the uplink transmission resource carrying a negative acknowledgment feedback, or an uplink transmission resource in a latest available uplink slot after a slot where the negative acknowledgment bit for an Nth downlink transmission resource was reported.

2. The method according to claim 1, wherein the criteria for triggering the cross-link interference measurement reporting comprises a failure of a number N times to decode a downlink transmission associated with a given hybrid automatic repeat request process identifier.

3. The method according to claim 1, wherein the criteria for triggering the cross-link interference measurement reporting comprises a failure of a number N times to decode any downlink transmissions associated with any available hybrid automatic repeat request process identifiers.

4. The method according to claim 3, further comprising: adjusting, by increasing or decreasing, the predetermined number N times to decode any downlink transmissions based on a selected modulation and coding scheme.

5. The method according to claim 1, further comprising: tracking a number of downlink transmission decoding failures over a predetermined time interval.

6. The method according to claim 5, further comprising: dynamically adjusting the predetermined time interval and a number N times to decode a downlink transmission based on a current cross-link interference condition.

7. An apparatus, comprising:

at least one processor; and at least one memory comprising computer program code, the at least one memory and the computer program code configured to, with storing instructions that, when executed by the at least one processor, cause the apparatus at least to:

receive a configuration with event triggered reporting from a network element, wherein the configuration specifies criteria for triggering a cross-link interference measurement reporting;

perform cross-link interference measurements of at least one radio transmission on network configured resources based on the configuration;

determine whether the criteria has been satisfied based at least on a condition out of a set of conditions identified in the criteria, wherein the condition comprises a decoding rate threshold of downlink transmissions; and transmit a measurement report of the cross-link interference measurements to the network element when the condition meets a predefined threshold, wherein a decoding rate of the decoding rate threshold of downlink transmissions accounts for downlink transmission failures during slots where cross-link interference is potentially present, wherein the measurement report is transmitted on at least one of the following:

an uplink transmission resource that carries hybrid automatic repeat request feedback from a downlink transmission resource that triggered the transmission of the measurement report, an independent uplink transmission resource from the uplink transmission resource carrying a negative acknowledgment feedback, or an uplink transmission resource in a latest available uplink slot after a slot where the negative acknowledgment bit for an Nth downlink transmission resource was reported.

8. The apparatus according to claim 7, wherein the criteria for triggering the cross-link interference measurement reporting comprises a failure of a number N times to decode a downlink transmission associated with a given hybrid automatic repeat request process identifier.

9. The apparatus according to claim 7, wherein the criteria for triggering the cross-link interference measurement reporting comprises a failure of a number N times to decode any downlink transmissions associated with any available hybrid automatic repeat request process identifiers.

10. The apparatus according to claim 9, wherein the at least one memory and the computer program code are further configured to, with storing instructions that, when executed by the at least one processor, cause the apparatus at least to:

adjust, by increasing or decreasing, the predetermined number N times to decode any downlink transmissions based on a selected modulation and coding scheme.

11. The apparatus according to claim 7, wherein the at least one memory and the computer program code are further configured to, with storing instructions that, when executed by the at least one processor, cause the apparatus at least to:

track a number of downlink transmission decoding failures over a predetermined time interval.

12. The apparatus according to claim 11, wherein the at least one memory and the computer program code are further configured to, with storing instructions that, when executed by the at least one processor, cause the apparatus at least to:

dynamically adjust the predetermined time interval and a number N times to decode a downlink transmission based on a current cross-link interference condition.

13. A method, comprising:

configuring a user equipment with a configuration of event triggered reporting, wherein the configuration specifies criteria for triggering a cross-link interference measurement reporting, and wherein the criteria comprises a decoding rate threshold of downlink transmissions;

receiving a measurement report of cross-link interference measurements from the user equipment; and applying a mechanism to remove or mitigate user equipment to user equipment cross-link interference upon receiving the measurement report, wherein a decoding rate of the decoding rate threshold of downlink transmissions accounts for downlink transmission failures during slots where cross-link interference is potentially present, wherein the measurement report is received on at least one of the following:

an uplink transmission resource that carries hybrid automatic repeat request feedback from a downlink transmission resource that triggered the transmission of the measurement report, an independent uplink transmission resource from the uplink transmission resource carrying a negative acknowledgment feedback, or an uplink transmission resource in a latest available uplink slot after a slot where the negative acknowledgment bit for an Nth downlink transmission resource was reported.

* * * * *